United States Patent
Magill et al.

(10) Patent No.: US 12,386,753 B2
(45) Date of Patent: Aug. 12, 2025

(54) SYSTEMS AND METHODS FOR MANAGING DIRTY DATA

(71) Applicant: Microsoft Technology Licensing, LLC, Redmond, WA (US)

(72) Inventors: Kevin Neal Magill, Durham, NC (US); Eric Francis Robinson, Raleigh, NC (US); Jason Lawrence Panavich, Raleigh, NC (US); Michael Bryan Mitchell, Fuquay-Varina, NC (US); Michael Peter Wilson, Fuquay-Varina, NC (US)

(73) Assignee: Microsoft Technology Licensing, LLC, Redmond, WA (US)

(*) Notice: Subject to any disclaimer, the term of this patent is extended or adjusted under 35 U.S.C. 154(b) by 67 days.

(21) Appl. No.: 18/068,475

(22) Filed: Dec. 19, 2022

(65) Prior Publication Data
US 2024/0202130 A1 Jun. 20, 2024

(51) Int. Cl.
*G06F 12/0891* (2016.01)
*G06F 12/0864* (2016.01)
*G06F 12/123* (2016.01)

(52) U.S. Cl.
CPC ...... *G06F 12/0891* (2013.01); *G06F 12/0864* (2013.01); *G06F 12/123* (2013.01)

(58) Field of Classification Search
CPC . G06F 12/0864; G06F 12/0891; G06F 12/123
See application file for complete search history.

(56) References Cited

U.S. PATENT DOCUMENTS

| | | | |
|---|---|---|---|
| 6,651,144 B1 | 11/2003 | Razdan | |
| 9,418,019 B2* | 8/2016 | Lepak | G06F 12/121 |
| 2003/0084247 A1* | 5/2003 | Song | G06F 12/123 |
| | | | 711/E12.072 |
| 2006/0143397 A1 | 6/2006 | O'Bleness | |
| 2007/0101068 A1 | 5/2007 | Anand et al. | |
| 2014/0059297 A1 | 2/2014 | Biswas et al. | |
| 2014/0089559 A1 | 3/2014 | Cai | |
| 2018/0322057 A1 | 11/2018 | Rosenbluth | |
| 2020/0401530 A1* | 12/2020 | Abulila | G06F 12/124 |
| 2022/0075726 A1 | 3/2022 | Magill et al. | |
| 2023/0109344 A1* | 4/2023 | Kelley | G06F 12/127 |
| | | | 714/30 |

OTHER PUBLICATIONS

International Search Report and Written Opinion received for PCT Application No. PCT/US23/035746, mailed on Mar. 6, 2024, 13 pages.
Young, et al., "TicToc: Enabling Bandwidth-Efficient DRAM Caching for both Hits and Misses in Hybrid Memory Systems", arxiv.org, 201 Olin Library Cornell University, Ithaca, NY, Jul. 4, 2019, 13 pages.

* cited by examiner

*Primary Examiner* — Aracelis Ruiz
(74) *Attorney, Agent, or Firm* — Holzer Patel Drennan (57) ABSTRACT

Embodiments of the present disclosure include techniques for managing dirty data. An agent receives a request for data. If the data is dirty data, the agent may use a replacement policy to determine if the data should be passed clean or dirty to the requestor. The replacement policy may correspond to how long the dirty data being stored in a cache line is to be maintained. In one embodiment, the replacement policy is a circuit, such as an SRAM and a logic circuit, for example.

20 Claims, 8 Drawing Sheets

SYSTEMS AND METHODS FOR MANAGING DIRTY DATA

BACKGROUND

The present disclosure relates generally to computer processors and in particular, to systems and methods for managing dirty data.

Modern processors include cache memories for storing data locally on chip. Data stored in different caches may be used by various system resources (agents) for performing processing tasks. When data in a cache is modified, management of the modified (aka dirty) data is a challenge.

Some cache coherence protocols allow multiple processors to hold cached copies of bytes of memory, keeping the copies in sync. A coherence granule is the aligned size in bytes of data on which the hardware manages cache coherency (e.g., 64 bytes). When held in a cache, a coherence granule is also referred to as a cache line. Participants in the cache coherence protocol are referred to as agents. Agents that hold a cached copy of a coherence granule can hold it in a Shared or Exclusive state, and in a Clean or Dirty state. Some coherence protocols provide for additional states. When one agent (a requestor) attempts to access a coherence granule, it may be found in another peer agent's cache, in which case the peer agent is referred to as a snoopee (sometimes also referred to as the snooper).

Some cache coherence protocols only allow one agent to hold a copy of a coherence granule in a Dirty state, which is the agent responsible for writing the dirty data back to memory. All other cached copies must not be in a Dirty state and are not responsible for writing back to memory.

When one agent performs a read, which does not demand an Exclusive state, and another agent holds a cached copy of the coherence granule, both agents may keep a Shared copy of the coherence granule. This may occur for loads, instruction fetches, memory management unit (MMU) hardware table walks, and hardware prefetches, for example, when the coherence granule is in shared memory and accessed by multiple agents. If the snoopee holds a Dirty copy of the coherence granule, it is common for cache coherence protocols to allow the Dirty state to "pass" to the requestor. It is also common for cache coherence protocols to allow the Dirty state to remain held by the snoopee. In either case, the requestor and the snoopee may retain a Shared copy of the coherence granule; only the ownership of the Dirty state is in question.

In some cases, the requestor may indicate its unwillingness to accept the Dirty state. For example, a read prompted by an instruction fetch may request to only receive a Clean copy of the coherence granule. In other cases, the requestor may freely accept a Clean or Dirty state. For example, a read prompted by a load may accept the coherence granule in any state. Determining which agent receives the dirty data is a challenge.

DETAILED DESCRIPTION

Described herein are techniques for managing dirty data. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Features and advantages of the present disclosure include a "snoopee" (one of multiple agents to access shared memory) to dynamically decide between "pass" or "retain" a dirty state cache line, upon receiving a snooped read request of a requestor agent. The snoopee may base the decision on the replacement policy information, for example, and in some embodiments, the exclusive or shared status for the cache line.

Figure 1:
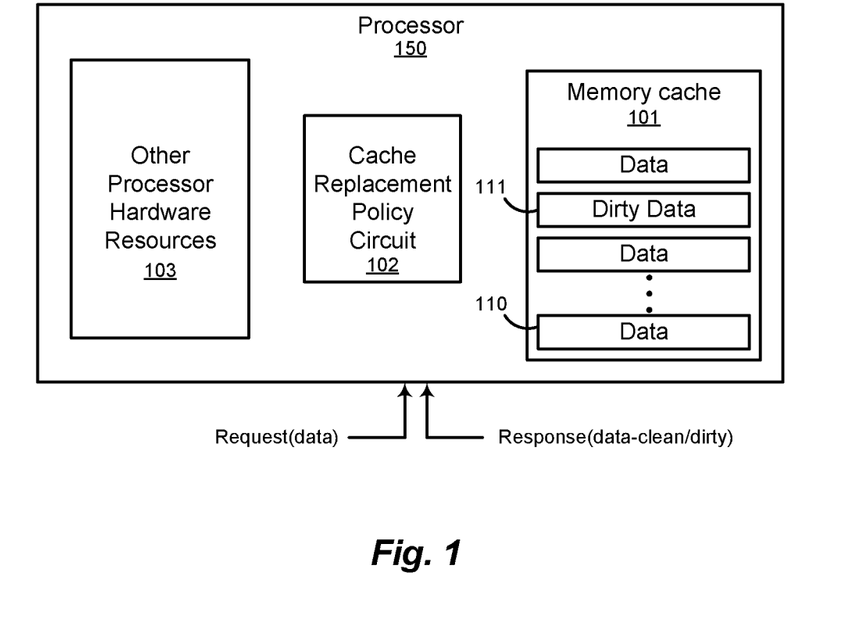
FIG. 1 illustrates a processor according to an embodiment.

FIG. 1 illustrates a processor 150 according to an embodiment. Processor 150 includes memory cache 101, cache replacement policy circuit 102, and other processor hardware resources 103. Memory cache (aka, "cache") 101 includes data 110 (aka, clean data) and dirty data 111. As described in more detail below, dirty data 111 may be data that has been modified, such that at some point in the future the dirty data must be written back to another memory structure (e.g., main memory or system memory) to ensure the changes are reconciled. Because such writebacks take more time and use more power, it is generally desirable to minimize the number of memory writebacks being made by the system. Features and advantages of the present disclosure use information in cache replacement policy circuit 102 (aka, replacement policy) to decide whether the requestor takes the data in a dirty state, and thus becomes responsible for the writeback, or if the snoopee retains the data in a dirty state and passes (i.e., sends) data designated as clean to the requestor. For instance, processor 150 receives a request for the data from a requestor. If the requested data is dirty data, then processor 150 may access a cache replacement policy entry associated with the particular dirty data. Processor 150 responds to the request based on the cache replacement policy applied to the dirty data. For instance, the dirty data may be sent to the requestor in response to the request as clean data based on a first cache replacement policy result, and the dirty data may be sent in response to the request as dirty data based on a second cache replacement policy result.

It will be understood by those skilled in the art that a variety of cache replacement policies may be used to determine if data should be passed from the snoopee to the requestor as clean or dirty. Accordingly, the different cache replacement policy results may vary by implementation. However, in some embodiments the cache replacement policy applied to the dirty data may produce a result that indicates an amount of time the dirty data has been stored in cache 101. For example, the first replacement policy result mentioned above may correspond to the dirty data being stored in a cache line to be maintained for a first period of time, and the second replacement policy result mentioned above may correspond to the dirty data being stored in a cache line to be maintained for a second period of time less than the first period of time. Data stored for longer periods of time may be more likely to have a writeback that happens soon, whereas data stored for shorter periods of time may be more likely to have a memory writeback after a longer period of time. In this case, dirty data may be aggregated over longer time periods and writebacks will more efficiently include more dirty data if dirty data is passed to another cache memory when writebacks are going to occur in a shorter time period. Accordingly, a cache replacement policy result that corresponds to data being held for a longer period of time may cause data to be passed clean (e.g., retain dirty) than a cache replacement policy result that corresponds to data being held for a shorter period of time, which may be passed dirty (retain clean), for example. Advantageously, in some embodiments, the replacement policy circuit is user configurable, which may allow users to fine tune when data is passed dirty or clean, for example.

Figure 2:
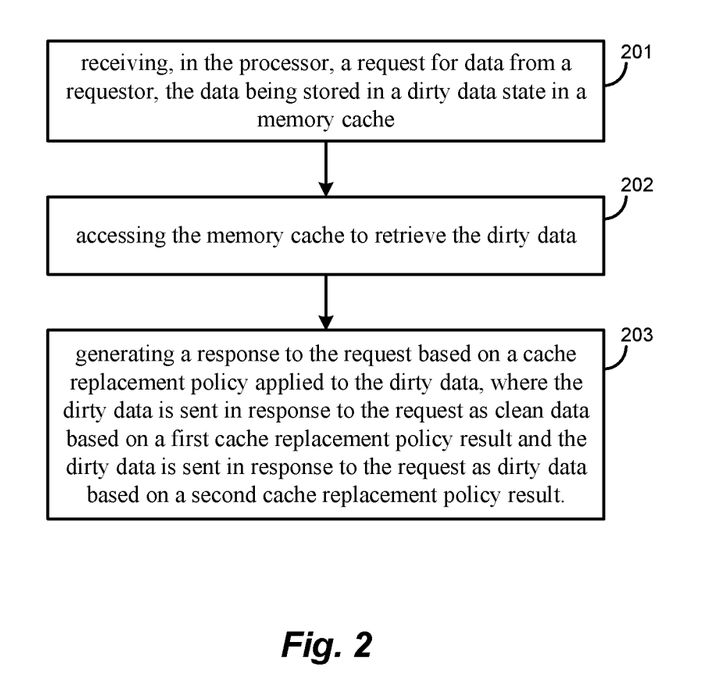
FIG. 2 illustrates a method of managing dirty data according to an embodiment.

FIG. 2 illustrates a method of managing dirty data according to an embodiment. At 201, a request is received (e.g., in a processor) for data from a requestor. The data may be stored in a dirty data state in a memory cache in the processor, for example. At 202, the memory cache is accessed to retrieve the dirty data. At 203, a response to the request is generated based on a cache replacement policy applied to the dirty data. The dirty data is sent in response to the request as clean data based on a first cache replacement policy result and the dirty data is sent in response to the request as dirty data based on a second cache replacement policy result.

Figure 3A:
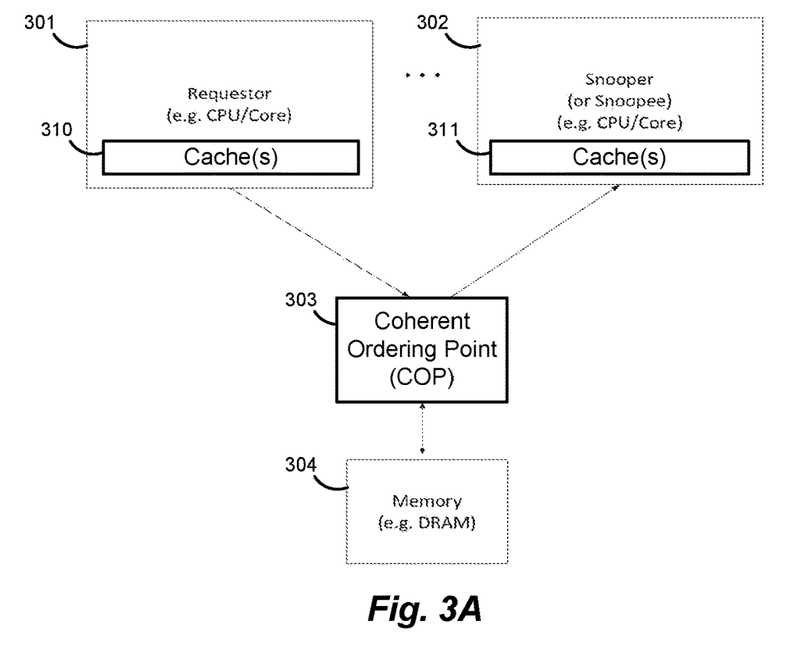
FIG. 3A illustrates managing dirty data across multiple systems according to an embodiment.
Figure 3B:
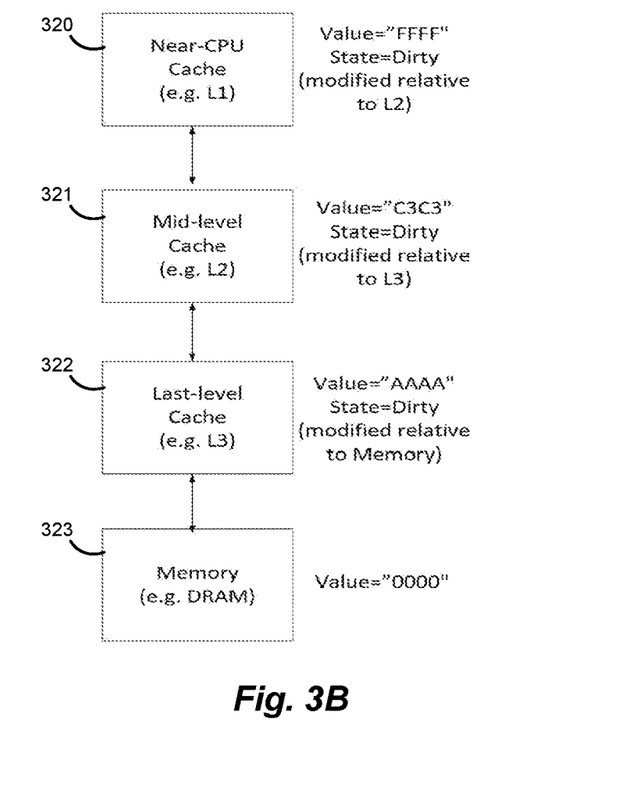
FIG. 3B illustrates multiple levels of memory.

FIG. 3A illustrates managing dirty data across multiple systems according to an embodiment. In this example, a requestor and snoopee are central processing units (CPU) and/or other compute cores 301 and 302 coupled together through a coherent ordering point (COP) 303 and to a memory 304, such as a DRAM. A Coherent Ordering Point (COP) for an address block (aka coherence granule) is used to ensure that all agents have a consistent view of the contents of that coherence granule. CPUs may include multiple caches 310 and 311 having different levels (e.g., smaller, higher speed L1 caches and larger, slower L2 and higher level caches). As illustrated in FIG. 3B, data in each level of a cache can be Dirty, meaning the data is modified relative to the next level of cache or memory. For example, a data value of "FFFF" at 320 is ultimately the value that will end up in memory, overwriting the values in the cache hierarchy down from the L1 (at 320) to the L2 (at 321), to the L3 (at 322), and finally writing back to memory at 323.

FIG. 3A may further illustrate how two agents hold Shared copies of a cache line. For example, requestor 301 and snoopee 302 may both have a data value of "FFFF" stored in their caches, while memory 304 has a corresponding data value of "0000." In this case, the cached copy in the agents has been modified relative to memory, but both agents hold the same value. The snoopee is in the Shared+Dirty state and has responsibility to eventually writeback this modified value to memory. The Requestor is in the Shared+Clean state, holding the same data value as the snoopee, but does not have responsibility to writeback to memory (it can "silently evict" it's copy when it needs to free up cache space).

A variety of common naming schemes exist for expressing cache coherency states (aka, data coherence values). One is the "MESI" terminology, which is prevalent in academia and in x86 processors. The following illustrates some of the characteristics of MESI:

TABLE 1

| MESI | Description |
| --- | --- |
| Modified | This cache has the only coherent cached copy, and it's Dirty |
| Exclusive | This cache has the only coherent cached copy, and it's not Dirty |
| Shared | Other caches may also hold a cached copy, and this cache has no responsibility to update the next-level cache or memory (the cache line may or may not be dirty) |
| Invalid | This cache does not hold a copy of this cache line |
| Owned | Other caches may also hold a cached copy, and this cache has a responsibility to update the next-level cache or memory. The cache line is dirty. |

As mentioned above, an important issue is whether an agent "Passes Dirty" versus "Passes Clean." As another example, the requestor's data value may have a coherence value of "Invalid," the snoopee's data value may be "FFFF," and the snoopee data coherence value is Exclusive+Dirty. In this example, the requestor sends a Read to the snoopee through COP 303. We have two choices for the end state: (i) Requestor=Shared+Dirty, Snoopee=Shared+Clean, Snoopee "passes dirty" to the requestor in this case and the requestor now has responsibility to eventually update memory, or (ii) Requestor=Shared+Clean, Snoopee=Shared+Dirty, Snoopee does not "pass dirty" and retains its responsibility to update memory.

Features and advantages of the present disclosure maintain the Dirty state in the agent predicted most likely to retain the cache line in its cache the longest period of time. This defers the memory update as long as possible and increases the likelihood of gathering more writes into the already-dirty cache line, reducing the total number of writes to memory.

Figure 4:
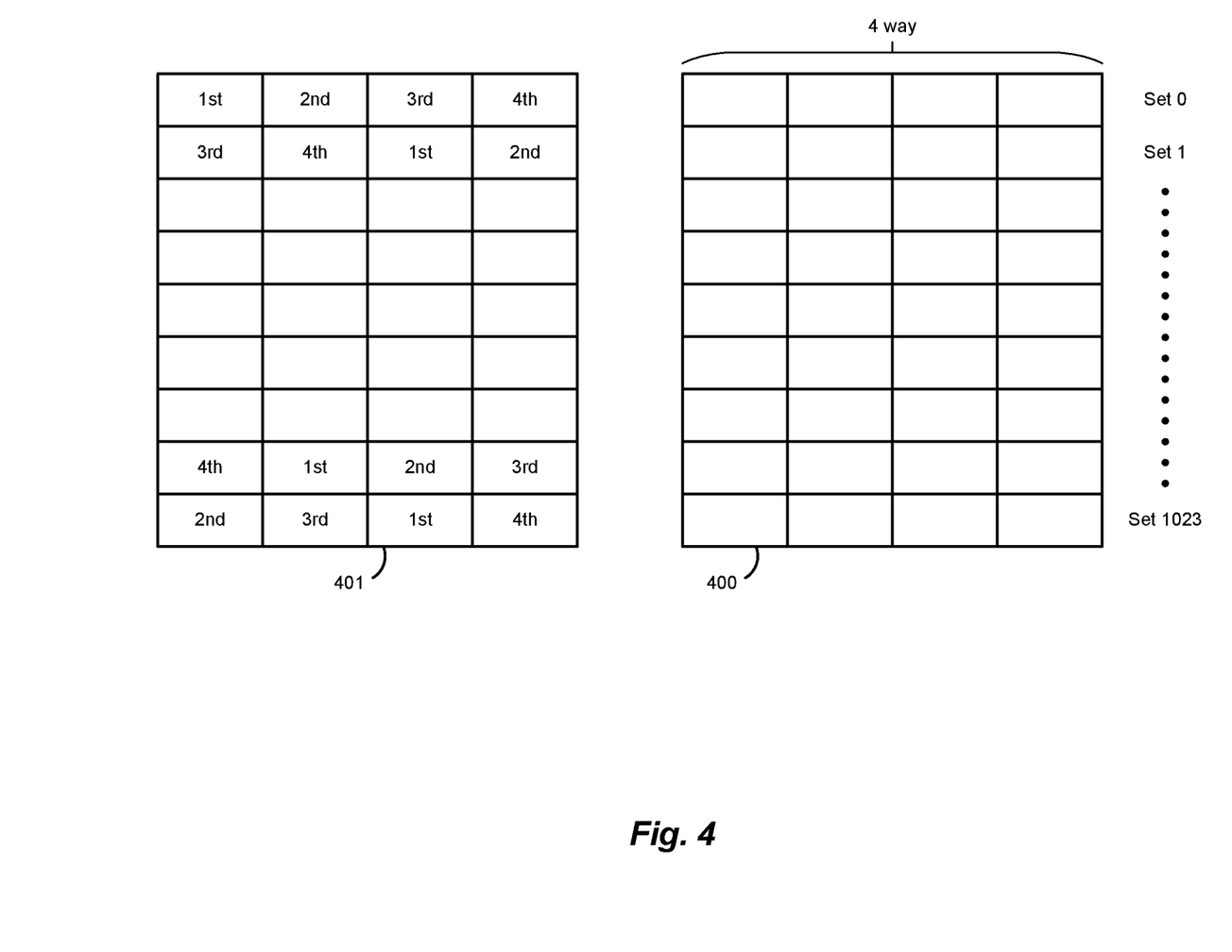
FIG. 4 illustrates an example N-way set associative memory cache and replacement policy according to an embodiment.

FIG. 4 illustrates an example N-way set associative memory cache 400 and replacement policy 401 according to an embodiment. In some embodiments, memory caches are N-way set associative caches. In this example, a 4-way set associative cache has 4096 cache lines (e.g., 1024×4). Set-associative caches are very common for caches above ~16 kB, especially in high-frequency/high-performance designs. This includes many L1, L2, L3, and L4 cache structures in most modern general purpose compute SOCs. In this example, 10 bits of the address are used to index into 1024 sets and the remaining address bits form a value to compare against the cache line tags stored for the 4 ways in the set to determine if the cache line exists in the set, and if so which "way" (or column) it's located in. Some caches may have 8 ways, or even 24 ways for large caches, for example. With a set-associative cache comes a replacement policy 401 to choose which "way" within each set should be "evicted" when cache capacity needs to be freed up. There are numerous cache replacement policy algorithms. This example illustrates a Least Recently Used (LRU) algorithm, which ranks the 4 "ways" within each set based on the recency of their accesses. One way is "1st place" or "most recently used" or "probably the most valuable to keep in the cache". One way is 2nd place, another 3rd place, and another is 4th place or "LRU" or "least valuable".

A requestor and the snoopee may both have a replacement policy to manage their caches. The snoopee has not traditionally used the replacement policy as part of servicing snoops, as its primary used for its "local" requests (e.g. requests from its CPU). However, the replacement policy structure can be accessed along with the cache access, even for a snoop, because the cache must do so for local requests. In various embodiments, the cache replacement policy is advantageously used to help guide decisions on snoops, in addition to its primary use case of managing evictions from the cache to free up space.

For example, the snoopee decides if it should retain Dirty or pass Dirty. Embodiments may allow users to provide a configurable threshold to determine where in the replacement policy ranking scheme to "draw the line" between retaining Dirty and passing Dirty. With the example below, the threshold may be programmed such that if the snooped cache line is at 1st or 2nd place, the snoopee will retain Dirty, and if at 3rd or 4th place it will pass Dirty. Or perhaps the threshold is set such that it will retain Dirty only if at 1st place, and pass Dirty if at 2nd, 3rd, or 4th place. If the cache had 24 ways per set, then the threshold configuration would allow for more granularity in choosing where to "draw the line" amongst the 24 rankings.

With other replacement policy algorithms that don't use a strict 1st, 2nd, 3rd place, etc. ranking system, there may be some system of value assigned to cache lines in order to determine which ones to keep versus evict. Using the cache replacement policy leverages that to use the same value system to decide whether to retain Dirty or pass Dirty. The LRU algorithm is just one example. One skilled in the art would be able to apply this technique to any cache replacement policy.

The replacement policy tracks the access history of the lines in its cache, ranking cache lines by their likelihood of being accessed in the near future. This information can also be used to determine the likelihood that a cache line will remain in the cache in the near future, rather than be evicted. While a replacement policy is typically used to answer the question, "which cache line within the set is least valuable to keep?", it can also be used to answer the question, "is a specific cache line within the set likely to be kept or be evicted soon?".

More specifically, when a snooped read request, which does not demand the Exclusive state and will accept the Dirty state, hits in a Dirty state in a snoopee, the snoopee will use the replacement policy information associated with the cache line to determine if the dirty data is likely to be evicted in the near future. If the snoopee determines the dirty data is likely to be continue to be held, it will retain the Dirty state and pass the Clean state to the requestor. If the snoopee determines the dirty data is likely to be evicted soon, it will pass the Dirty state to the requestor and retain the Clean state. This increases the likelihood that the coherence granule held in the Dirty state remains in the cache hierarchy for a longer period of time, deferring a writeback to memory.

The following are examples of using the snoopee's replacement policy information to determine if the Dirty state should be retained or passed. The following examples use an 8-way set-associative cache for illustrative purposes:

The snoopee uses the True LRU (Least Recently Used) replacement policy or its derivatives (e.g. LRU, LIP, BIP, DIP), where each way in a set is ranked from Most Recently Used to Least Recently Used:
If the snoopee's Dirty cache line is above a threshold, in the direction of Most Recently used, the snoopee will retain the Dirty state and pass the Clean state
If the snoopee's Dirty cache line is below a threshold, in the direction of Least Recently used, the snoopee will retain the Clean state and pass the Dirty state (e.g., if the snoopee's Dirty cache line is the Most, second-Most, third-Most, or fourth-Most Recently Used way in the set, retain the Dirty state, otherwise pass the Dirty state).

The snoopee uses a Pseudo-LRU replacement policy, which approximates True LRU by ranking each way in a set from Most Recently Used to Least Recently Used via a binary tree:
The Pseudo-LRU binary tree can be "unrolled" to create a ranked order of ways from Most Recently Used to Least Recently Used
The "unrolled" ranked order of ways can be subject to the same threshold-based decisions as with True LRU The snoopee uses an RRIP-based (Re-Reference Interval Prediction) replacement policy that uses RRPV's (Re-Reference Prediction Values) to assign value to each way in a set (e.g. SRRIP, BRRIP, DRRIP, TA-DRRIP, Hawkeye):
If the snoopee's Dirty cache line is above a threshold, in the direction of a "near re-reference", the snoopee will retain the Dirty state and pass the Clean state
If the snoopee's Dirty cache line is below a threshold, in the direction of a "distant re-reference", the snoopee will retain the Clean state and pass the Dirty state (e.g., if the snoopee uses a 3-bit RRPV, and the snoopee's Dirty cache line has an RRPV of 0, 1, 2, or 3, retain the Dirty state, otherwise pass the Dirty state).

In each example above, a threshold is provided to determine if the snoopee's Dirty cache line is above or below the limit for retaining or passing the Dirty state. This threshold may be configurable by software, such that the decision can be tuned for the intended system or set of workloads to be run.

Figure 5:
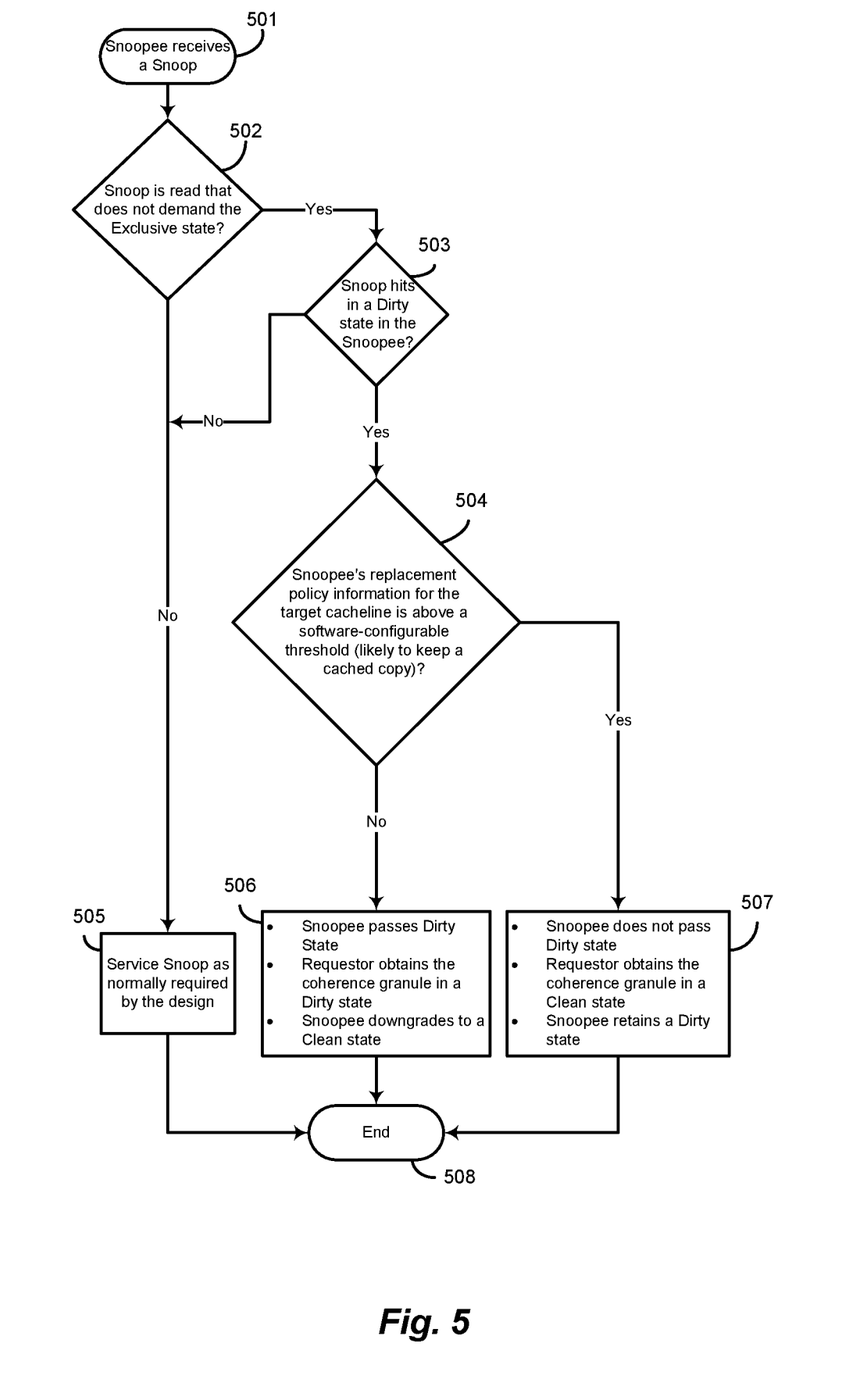
FIG. 5 illustrates an example algorithm according to an embodiment.

FIG. 5 illustrates an algorithm for using a snoopee cache replacement policy according to an embodiment. In some embodiments, a snoopee holding data in an Exclusive and Dirty state may be more likely to retain a cached copy of the data than one holding it in a Shared and Dirty state when accessed by a snooped read request which does not demand the Exclusive state and will accept the Dirty state. The requestor is likely only reading the data, due to not demanding the Exclusive state. However, a snoopee in the Exclusive and Dirty state likely modified the data by writing to it, in which case it may write to it again since the data may contain many bytes with spatial locality. The snoopee with the data in the Exclusive and Dirty state may be more likely to retain the data (by writing to it again) than the requestor who's only reading it. In contrast, a snoopee holding the coherence granule in the Shared and Dirty state may be equally as likely to continue holding a cached copy of the coherence granule as the requestor.

The process is illustrated in FIG. 5. At 501, snoopee receives a snoop for data. At 502, the snoop is read. If an exclusive state is not demanded, the process moves to 503, else the process moves to 505. At 503, the system branches based on whether the data is dirty. If dirty, then the process moves to 504, else the process moves to 505. At 505, the snoop is serviced without accessing the replacement policy. At 504, the replacement policy is accessed. If above a threshold, then the process moves to 507, else the process moves to 506. At 506 the data is passed as dirty. At 507, the data is passed as clean.

Figure 6:
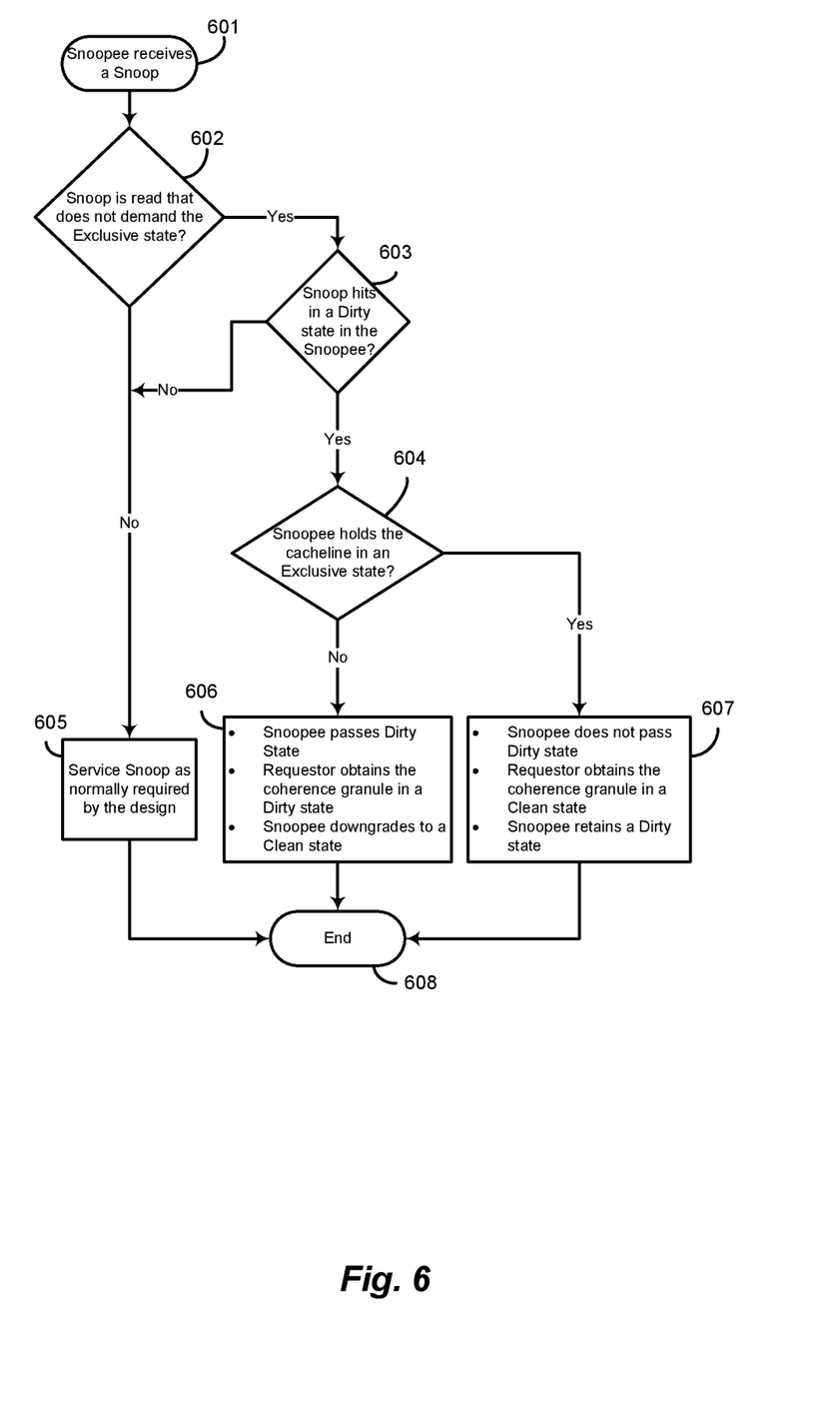
FIG. 6 illustrates another example algorithm according to an embodiment.

FIG. 6 illustrates another algorithm according to an embodiment. In this example, when a snooped read request, which does not demand the Exclusive state and will accept the Dirty state, hits in a Dirty state in a snoopee at 602-603, the snoopee will use the Exclusive versus Shared state to determine, at 604, if the data is more likely to be held (i.e., cached) longer by the snoopee or the requestor. If the snoopee holds the data in the Exclusive and Dirty state, it will retain the Dirty state rather than passing the Dirty state at 607. If the snoopee holds the data in the Shared and Dirty state, it will retain the Clean state and pass the Dirty state at 606.

Figure 7:
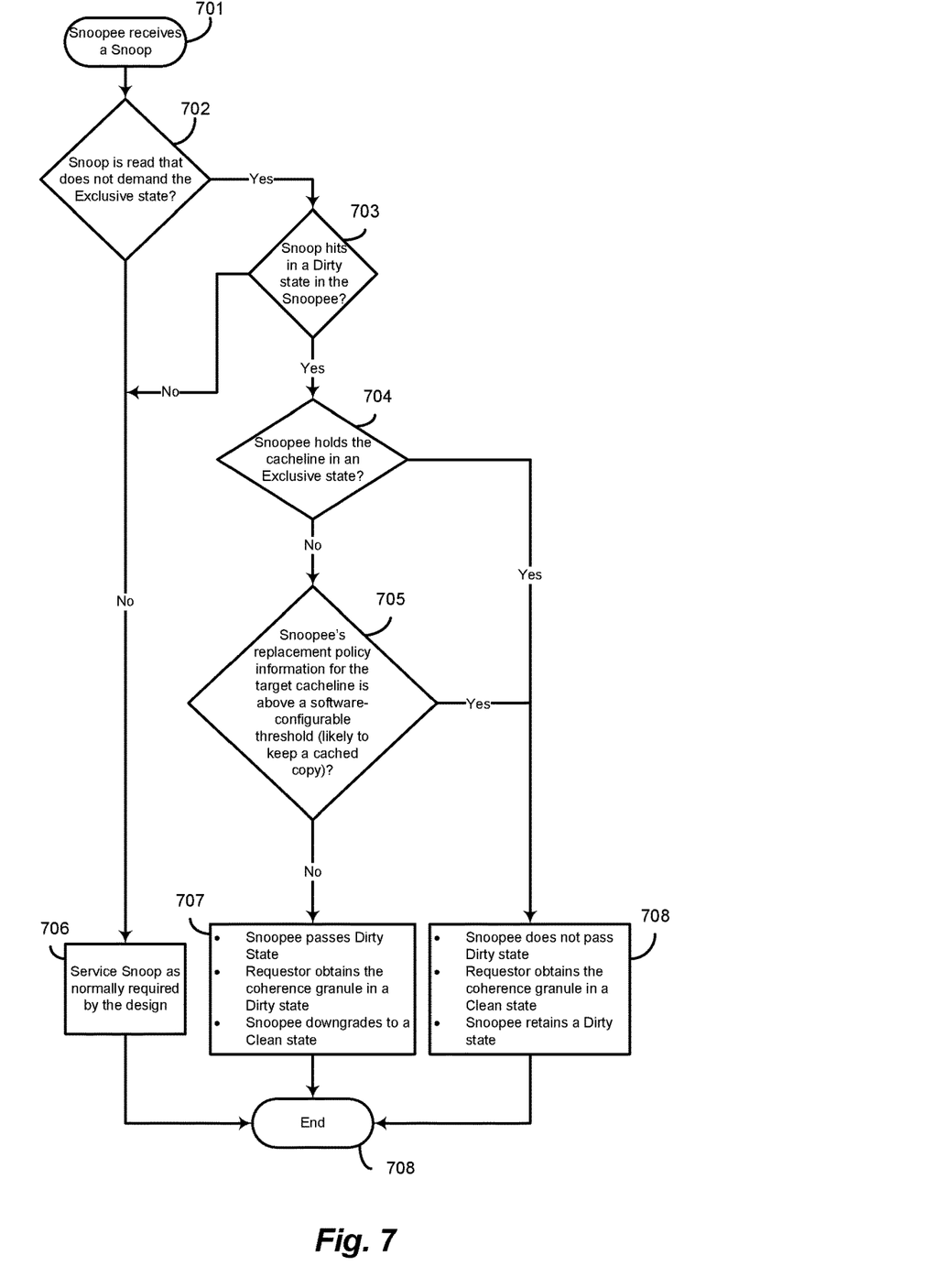
FIG. 7 illustrates another example algorithm according to an embodiment.

FIG. 7 illustrates another example algorithm according to an embodiment. In some embodiments, the snoopee's replacement policy may be combined with data in an exclusive state. For example, the exclusive state may take priority over the replacement policy. If the snoopee holds the data in the Exclusive and Dirty state at 703-704, the snoopee retains the Dirty state at 708 rather than passing the Dirty state, regardless of the replacement policy information for the cacheline. If the snoopee holds the data in the Shared and Dirty state, the snoopee uses the replacement policy information for the cacheline at 705 to determine if it should pass or retain the Dirty state at 707 or 708.

Figure 8:
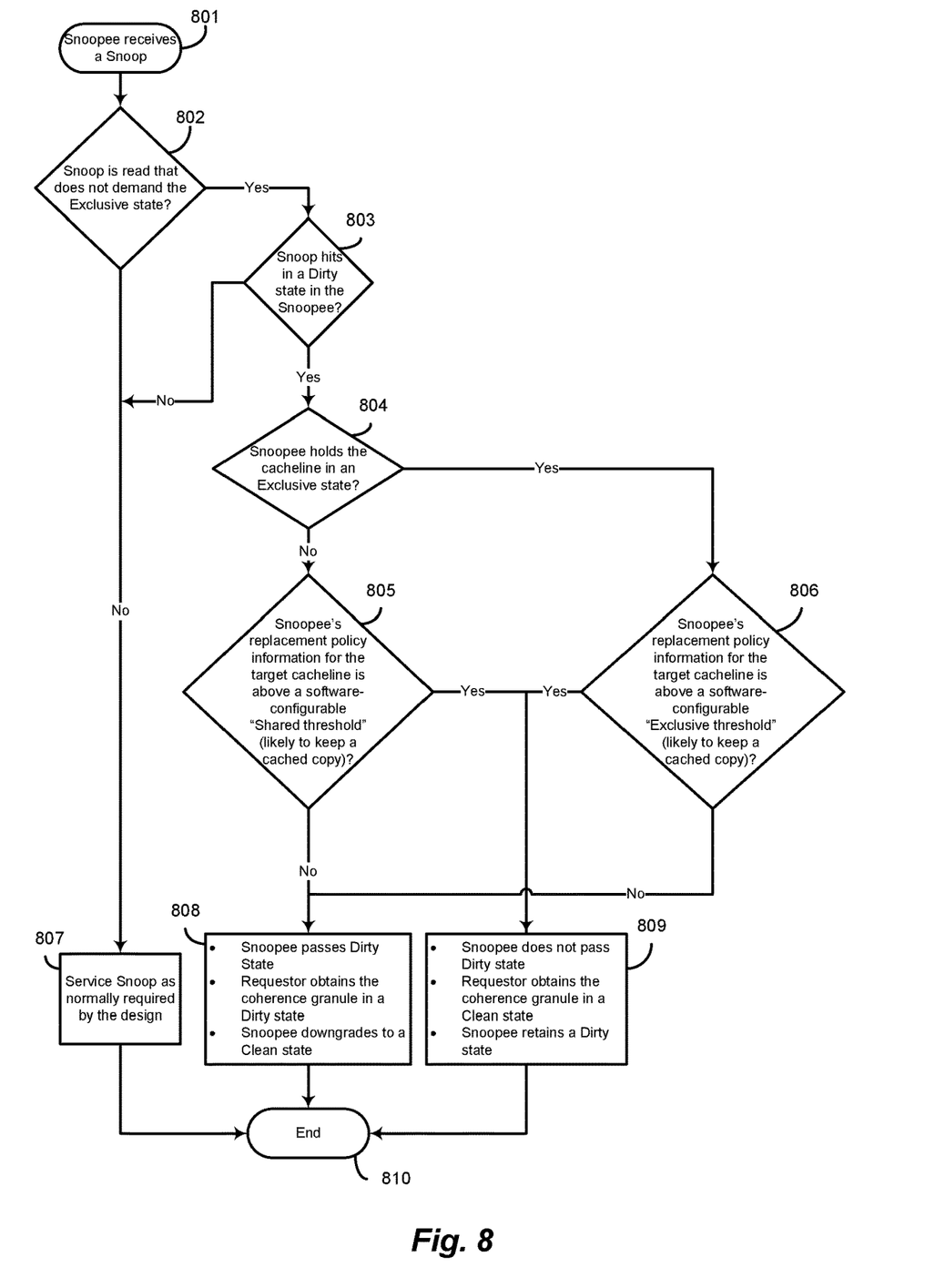
FIG. 8 illustrates another example algorithm according to an embodiment.

FIG. 8 illustrates another example algorithm according to an embodiment. In this example, the snoopee holds the cacheline in an exclusive state and uses replacement policy with independent thresholds. For instance, if the snoopee holds the data in the Exclusive and Dirty state as determined at 803-804, the snoopee uses the replacement policy information for the cacheline to determine, at 806, if it should retain or pass the Dirty state at 808-809, using an "Exclusive Threshold" to guide the decision. The Exclusive Threshold used at 806 may be the same as the threshold described above, for example, but may only be used when the cacheline is in an Exclusive state. As above, the threshold may be software programmable, for example.

If the snoopee holds the data in the Shared and Dirty state as determined at 803-804, the snoopee also uses the replacement policy information for the cacheline to determine, at 805, if it should retain or pass the Dirty state at 808-809, using a "Shared Threshold" to guide the decision. The Shared Threshold used at 805 may be the same as the threshold described above, for example, but may only be used when the cacheline is in a Shared state. As above, the threshold may be software programmable, for example.

Figure 9:
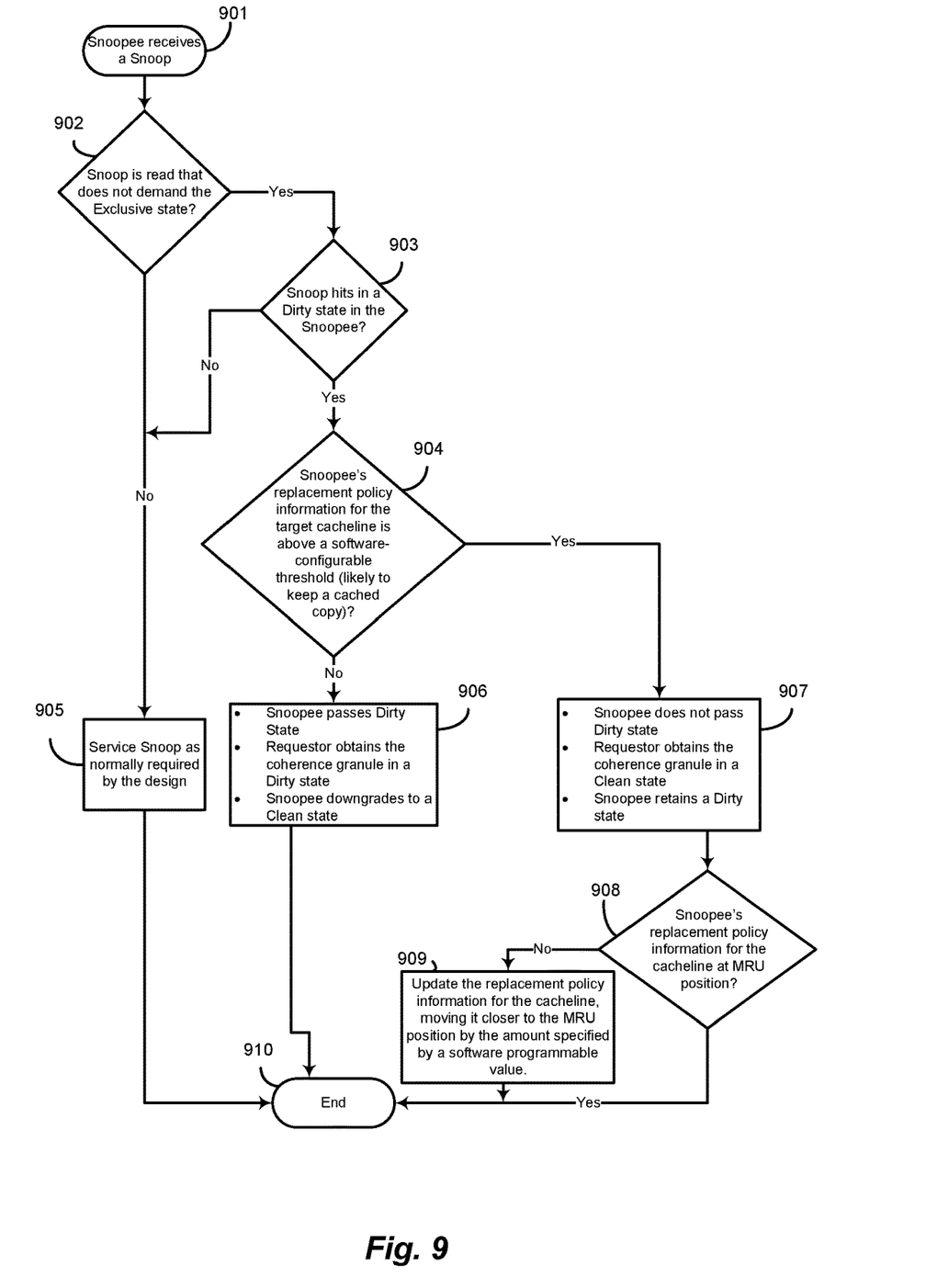
FIG. 9 illustrates another example algorithm according to an embodiment.

FIG. 9 illustrates another example algorithm according to an embodiment. Certain embodiments of the present disclosure involve modifying replacement policy information when keeping a dirty copy. Methods of determining to pass or retain data in a dirty state can be extended by modifying the replacement policy information for the snooped cacheline, such that the snoopee increases the likelihood of retaining the cacheline, whenever the snoopee chooses to retain data in a dirty state. This may increase the likelihood of keeping the dirty data cached in the system for a longer period of time.

For example, if a snoopee implementing an LRU replacement policy receives a snooped read request which does not demand the Exclusive State at 901-902, the snoop hits in a Dirty state in the snoopee at 903, and the snoopee decides to retain the Dirty state at 907, then the snoopee moves the cacheline toward an MRU. For example, it could implement one of the following: move the replacement policy information one step closer to MRU and one step further from LRU, or move the replacement policy information to the MRU position. The amount to move the replacement policy information is software programmable.

Various embodiments of the present disclosure may provide a range of advantages over static or fixed decisions to retain the Dirty state in the snoopee or pass the Dirty state from the snoopee to the requestor. Dynamically determining to retain the Dirty state in the snoopee or pass the Dirty state from snoopee to requestor, when a snooped read request which does not demand the Exclusive state and will accept the Dirty state hits in a Dirty state in a snoopee may allow for holding a cached copy of a Dirty coherence granule for a longer period of time. This allows more writes to gather to it before it is written back to memory, thereby improving performance and reducing power consumption by performing fewer writes to main memory.

Dynamically determining to retain or pass the Dirty state based on the snoopee's replacement policy information for the cacheline may use an existing state already present in the snoopee, allowing for better decision-making with very little additional hardware, for example.

Dynamically determining to retain or pass the Dirty state based on the snoopee holding the coherence granule in an Exclusive or Shared state may use existing state already present in the snoopee, allowing for better decision-making with very little additional hardware Dynamically determining to retain the Dirty state when the snoopee holds the coherence granule in an Exclusive state, and dynamically determining to retain or pass the Dirty state based on the snoopee's replacement policy information for the cacheline when the snoopee holds the coherence granule in a Shared state is an example of combining the certain disclosed methods to provide for more nuanced decision-making, with little additional hardware.

Dynamically determining to retain or pass the Dirty state based on the snoopee's replacement policy information for the cacheline, using one threshold for the decision when the snoopee holds the coherence granule in an Exclusive state and another threshold when the snoopee holds the coherence granule in a Shared state combines the certain disclosed methods to provide for more nuanced decision-making, with little additional hardware.

Modifying the replacement policy information in the snoopee to increase the likelihood of retaining a cached copy, when the snoopee chooses to retain the Dirty state using one of the above methods may extend the above methods to improve the likelihood of keeping the Dirty state cached whenever the snoopee chooses to retain the Dirty state, for example.

Further Examples

Each of the following non-limiting features in the following examples may stand on its own or may be combined in various permutations or combinations with one or more of the other features in the examples below.

In various embodiments, the present disclosure may be implemented as a processor or method.

In some embodiments, the present disclosure includes dynamically determining to retain a dirty data state in a snoopee or pass the dirty state from snooper to a requestor, when a snooped read request which does not demand an exclusive state and will accept the dirty state hits in a dirty state in a snooper In some embodiments, the present disclosure includes dynamically determining to retain or pass the Dirty state based on the snoopee's replacement policy information for a cache line In some embodiments, the present disclosure includes software to control the threshold used with the decision to pass or retain dirty data.

In some embodiments, the present disclosure includes dynamically determining to retain or pass the dirty state based on the snoopee holding the data (or coherence granule) in an exclusive or shared state.

In some embodiments, the present disclosure includes dynamically determining to retain the dirty state when the snoopee holds the data in an exclusive state, and dynamically determining to retain or pass the dirty state based on the snoopee's replacement policy information for the cache line when the snoopee holds the coherence granule in a shared state.

In some embodiments, the present disclosure includes dynamically determining to retain or pass the dirty state based on the snoopee's replacement policy information for the cache line, using one threshold for the decision when the snoopee holds the data in an exclusive state and another threshold when the snoopee holds the coherence granule in a shared state. In some embodiments the thresholds may be software configurable, for example.

In some embodiments, the present disclosure includes modifying the replacement policy information in the snoopee to increase the likelihood of retaining a cached copy, when the snoopee chooses to retain the dirty state using one of the above methods. Some embodiments may include software to control the amount of the increase in the replacement policy's value, for example.

In one embodiment, the present disclosure includes a processor comprising: a memory cache comprising dirty data; and a cache replacement policy circuit, wherein the processor receives a request for the dirty data from a requestor, and wherein the processor responds to the request based on the cache replacement policy applied to the dirty data, wherein the dirty data is sent in response to the request as clean data based on a first cache replacement policy result and the dirty data is sent in response to the request as dirty data based on a second cache replacement policy result.

In another embodiment, the present disclosure includes a method of managing data in a processor comprising: receiving, in the processor, a request for data from a requestor, the data being stored in a dirty data state in a memory cache; accessing the memory cache to retrieve the dirty data; and generating a response to the request based on a cache replacement policy circuit applied to the dirty data, where the dirty data is sent in response to the request as clean data based on a first cache replacement policy result and the dirty data is sent in response to the request as dirty data based on a second cache replacement policy result.

In one embodiment, the cache replacement policy circuit is configurable.

In one embodiment, the first cache replacement policy result corresponds to the dirty data being stored in a cache line to be maintained for a first period of time, and wherein the second cache replacement policy result corresponds to the dirty data being stored in a cache line to be maintained for a second period of time less than the first period of time.

In one embodiment, the memory cache is a set-associative cache.

In one embodiment, a plurality of cache lines are retrieved with a cache line storing the dirty data, and wherein the first cache replacement policy result indicates that the cache line storing the dirty data ranks, among the plurality of cache lines, below a threshold and the second cache replacement policy result indicates that the cache line storing the dirty data ranks, among the plurality of cache lines, above the threshold.

In one embodiment, the threshold is configurable.

In one embodiment, the plurality of cache lines are ranked based on a recent use.

In one embodiment, the plurality of cache lines are ranked using a least recently used algorithm.

In one embodiment, the least recently used algorithm is in a binary tree.

In one embodiment, the cache replacement policy circuit comprises a random access memory comprising replacement bits and a logic circuit.

In one embodiment, the cache replacement policy circuit executes a re-reference interval prediction replacement policy.

In one embodiment, prior to responding to the request based on the cache replacement policy circuit, the processor sends or retains the dirty data based on the memory cache storing the requested data in an exclusive or shared state.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A processor comprising:
a memory cache comprising dirty data; and
a cache replacement policy circuit,
wherein the processor receives a request for the dirty data from a requestor,
wherein the processor responds to the request based on the cache replacement policy circuit applied to the dirty data, wherein the dirty data is sent in response to the request as clean data based on a first cache replacement policy result and the dirty data is sent in response to the request as dirty data based on a second cache replacement policy result,
wherein the processor retains the dirty data based on the memory cache storing the requested data in an exclusive state, and
wherein the first and second cache replacement policy results are based on a first threshold when the dirty data is stored in an exclusive state.

2. The processor of claim 1, wherein the cache replacement policy circuit is configurable.

3. The processor of claim 1, wherein the first cache replacement policy result corresponds to the dirty data being stored in a cache line to be maintained for a first period of time, and wherein the second cache replacement policy result corresponds to the dirty data being stored in a cache line to be maintained for a second period of time less than the first period of time.

4. The processor of claim 1, wherein the memory cache is a set-associative cache.

5. The processor of claim 4, wherein a plurality of cache lines are retrieved with a cache line storing the dirty data, and wherein the first cache replacement policy result indicates that the cache line storing the dirty data ranks, among the plurality of cache lines, below a threshold and the second cache replacement policy result indicates that the cache line storing the dirty data ranks, among the plurality of cache lines, above the threshold.

6. The processor of claim 5, wherein the threshold is configurable.

7. The processor of claim 5, wherein the plurality of cache lines are ranked based on a recent use.

8. The processor of claim 7, wherein the plurality of cache lines are ranked using a least recently used algorithm.

9. The processor of claim 8, wherein the least recently used algorithm is in a binary tree.

10. The processor of claim 1, wherein the cache replacement policy circuit comprises a random access memory comprising replacement bits and a logic circuit.

11. The processor of claim 1, wherein the cache replacement policy circuit executes a re-reference interval prediction replacement policy.

12. The processor of claim 1, wherein, prior to responding to the request based on the cache replacement policy circuit, the processor sends or retains the dirty data based on the memory cache storing the requested data in the exclusive or shared state.

13. The processor of claim 1, wherein the processor responds to the request based on the cache replacement policy circuit when the memory cache stores the requested data in a shared state.

14. The processor of claim 1, wherein the first and second cache replacement policy results are further based on a second threshold when the dirty data is stored in a shared state.

15. The processor of claim 14, wherein the first and second thresholds are configurable.

16. The processor of claim 1, further comprising modifying information used in the cache replacement policy circuit when the dirty data is sent in response to the request as clean data.

17. A method of managing data in a processor comprising:
receiving, in the processor, a request for data from a requestor, the data being stored in a dirty data state in a memory cache;
accessing the memory cache to retrieve the dirty data; and
generating a response to the request based on a cache replacement policy applied to the dirty data, where the dirty data is sent in response to the request as clean data based on a first cache replacement policy result and the dirty data is sent in response to the request as dirty data based on a second cache replacement policy result,
wherein the processor retains the dirty data based on the memory cache storing the requested data in an exclusive state, and
wherein the first and second cache replacement policy results are based on a second threshold when the dirty data is stored in a shared state.

18. The method of claim 17, wherein the first cache replacement policy result corresponds to the dirty data being stored in a cache line to be maintained for a first period of time, and wherein the second cache replacement policy result corresponds to the dirty data being stored in a cache line to be maintained for a second period of time less than the first period of time.

19. The method of claim 17, wherein the memory cache is a set-associative cache.

20. The method of claim 19, wherein a plurality of cache lines are retrieved with a cache line storing the dirty data, and wherein the first cache replacement policy result indicates that the cache line storing the dirty data ranks, among the plurality of cache lines, below a threshold and the second cache replacement policy result indicates that the cache line storing the dirty data ranks, among the plurality of cache lines, above the threshold.

* * * * *